Patented Jan. 13, 1942

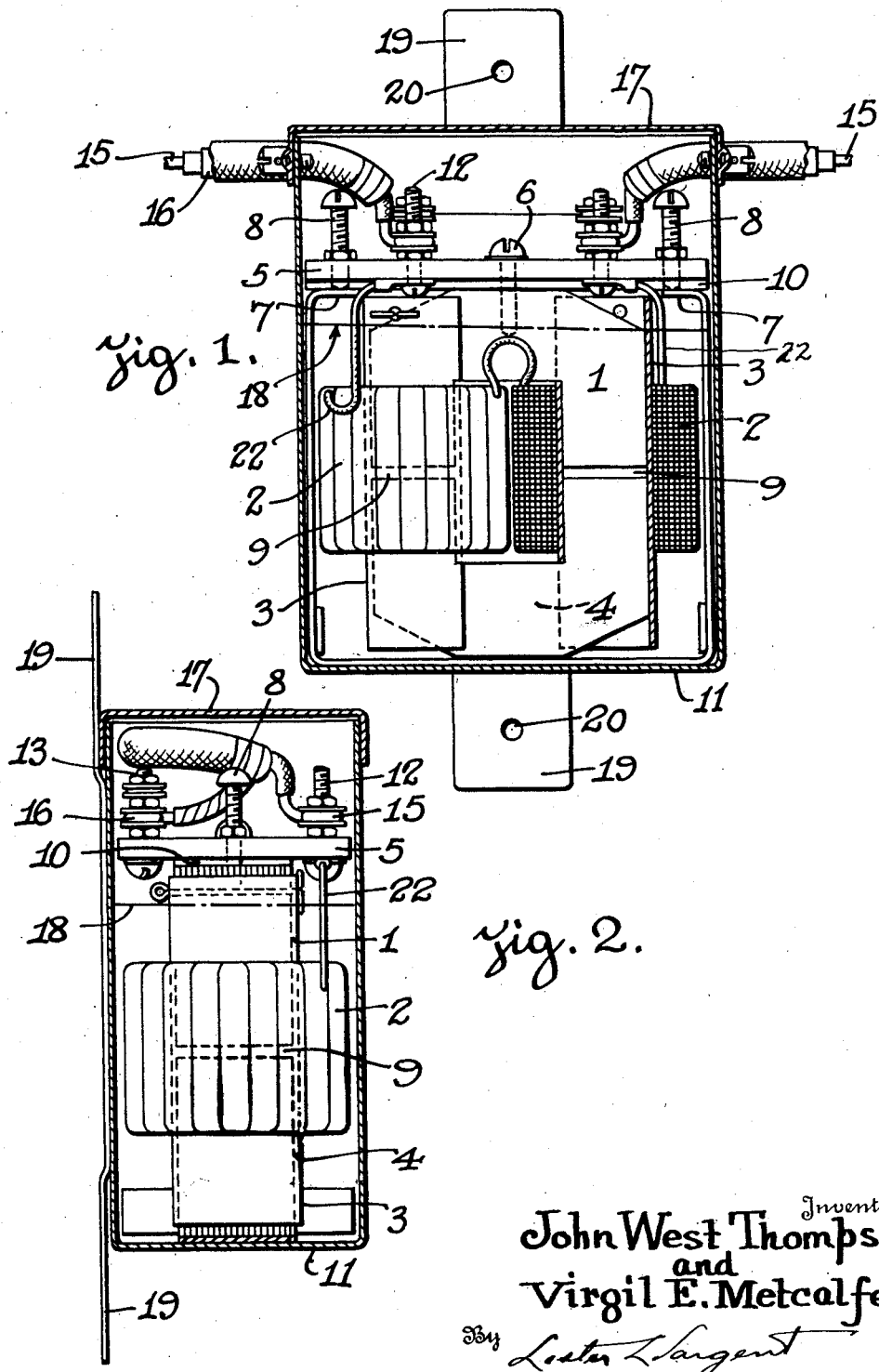

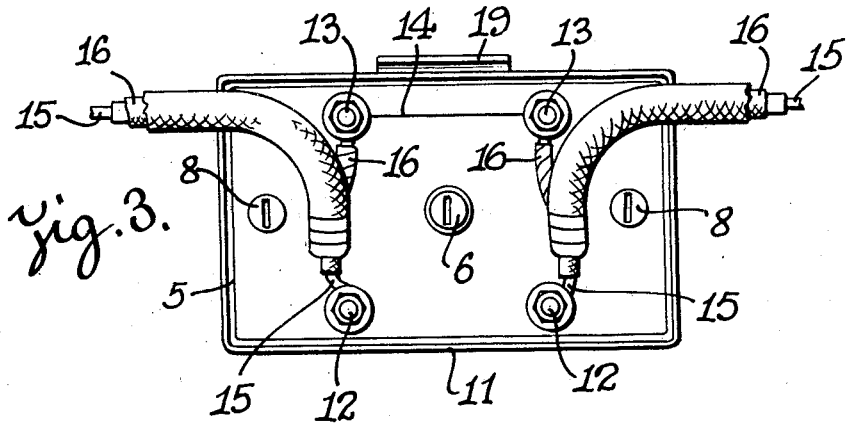
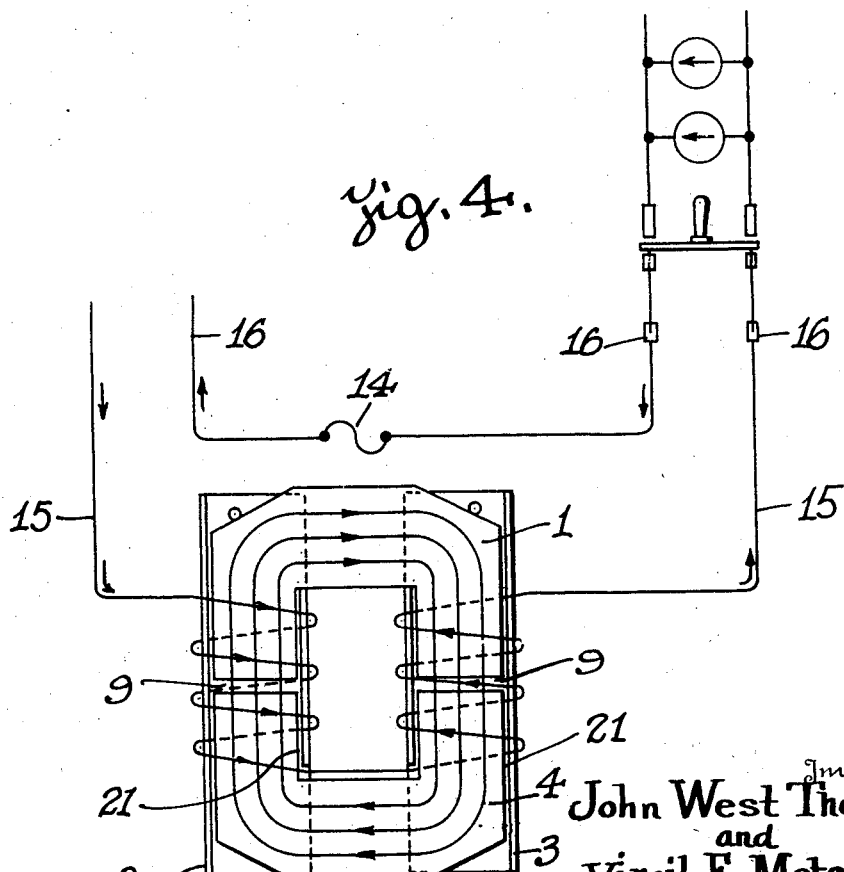

2,269,922

UNITED STATES PATENT OFFICE 2,269,922

POWER LIMITER

John West Thompson and Virgil Ellsworth Metcalfe, Puebla, Mexico

Application July 1, 1939, Serial No. 282,564
In Mexico July 12, 1938

1 Claim. (Cl. 171—242)

The main object of this invention is to prevent the unauthorized use of electrical energy by clients under flat rate contracts, by automatically introducing a high reactance into the electric circuit when an attempt is made to connect more load than that contracted. The novelty of the device consists in the construction and arrangement of parts so that any attempt to overload it will actually result in less power being taken from the supply circuit.

Another important advantage of this current or power limiting device is the complete elimination of electrical contacts, which in previous devices placed on the market have been used to open or close the circuit. It is well known fact that contacts, even when made of special metals, are subject to oxidation and subsequent burning, resulting in considerable expense for replacements and maintenance, besides annoyance to the customer.

Contact breaking devices are particularly susceptible to damage by repeated short circuits, and all of this expense and trouble is absent in the device described in detail in the following paragraphs. Instead of opening the electric circuit by contacts, we close a magnetic circuit in case of excess load, which effectually limits the flow of electric energy to a value below that contracted, even under short circuit conditions.

In order to keep down the weight of the device, a new special low-loss silicon steel of high permeability is used to give the necessary magnetic flux and reactance desired.

We attain the objects of our invention by the mechanism illustrated in the accompanying drawings, in which—

Figure 1 is a front plan view of the apparatus;

Fig. 2 is a side elevation of same;

Fig. 3 is a top plan view; and

Fig. 4 is a diagrammattic view of the electric and magnetic circuit.

In accordance with standard practice, in single pole limiters, a fuse is installed inside the cover of the limiter, in the ground side of the circuit, to prevent excess use of unauthorized energy by reversing the supply leads and using a fraudulent ground.

The modern tungsten filament in incandescent lamps has a comparatively low resistance when cold, and for the first few hundredths of a second permits up to fourteen times normal current to pass. This large current creates such a strong flux across the air gap in the reactor that it would ordinarily close at the instant of connection if it were not for the ingenious arrangement described below.

The apparatus is submerged in a bath of insulating liquid, either oil or incombustible (known commercially as Pyranol, Inersteen, etc.,) that normally fills all cavities including those between the pole faces of the reactor core and its armature. When there is a sudden attraction of the core, this liquid cannot be expelled instantaneously on account of the small clearance between the armature and the sides of the Bakelite tube which acts as a guide. If, however, the excessive pull persists, the liquid will finally be forced out thus permitting the closing of the magnetic circuit through both the laminated steel core and armature. This arrangement which we believe to be novel gives the same effect as that of a dash pot without incurring the expense of providing an independent dash pot. Also the liquid referred to serves to improve the insulation of the coils as well as dissipate the small amount of heat that is generated in the coils by the electric current.

Referring to the drawings in detail, the limiter consists of a special silicon laminated steel core in U section on each leg of which is mounted an insulated coil of copper wire 2, wound over a rectangular tube or casing of Bakelite 3, both coils being connected in series.

Below the pole faces of the steel core of the fixed armature I there is a U-shaped armature 4 identical to the fixed armature I, the core of which can move freely up and down, sliding inside of the lower half of the rectangular Bakelite tubes 3. The core of armature I is fastened to the connection plate 5 by means of a screw 6 and the connection plate rests on the ends of a stirrup 7 made of a thin sheet of steel supported by the bottom of the limiter case II.

At the two ends of the plate 5 are two screws 8 which serve to adjust the calibration of the device, raising or lowering the armature core I together with its respective coils 2 and varying in this manner the distances 9 between the pole faces of the fixed armature I and the movable armature 4. These screws 8 pass through threaded holes in the strip of steel 10 which is off the same width as the stirrup 7 and shown on the under side of the connection plate 5.

On the connection plate 5, shown in Fig. 3 there are four screws or studs which serve to connect the limiter with the distribution system and the consumer's installation. The screws 12 at the lower end are connected to the coil terminals 22 (see Fig. 1). The other two screws serve to fasten a fuse wire 14, the object of which will be explained in the functioning of the limiter.

The limiter is connected to the distribution system and to the installation of the consumer by means of concentric cables, using the central conductors 15 as the live wire, connecting them to the studs 12, and the neutral or outside conductors 16 of the concentric cables to the studs 13. In other words, this diagram clearly shows that the two wound coils are connected in series with each other, and both in series with the load in the phase wire side of the supply circuit. The fuse is connected in series with the load, and on the other side of the supply circuit.

The limiter is enclosed in a rectangular steel case 11 (see Fig. 1), with its cover 17. This case serves also as a container of the insulating liquid in which the limiter is submerged up to level 18, as shown in Figs. 1 and 2.

The limiter with its case is fastened to the wall by means of the two steel ears 19 welded to the case, as shown in Figs. 1 and 2, the supporting screws passing through the holes 20.

After the limiter has been adjusted in the laboratory, there is poured over the connection plate a liquid insulating compound that hardens upon cooling forming a solid cap which hermetically seals the case, preventing leakage of the liquid or the entrance of dust or moisture.

The operation of the apparatus is as follows:

Under normal or contracted load, the magnetic flux across the air gap 9 between the armature core 4 and magnet core 1 is not of sufficient strength to lift the core 4 and the resulting impedance of the apparatus is so designed that the voltage drop across the lamps is less than 3% of the supply of voltage. Should the customer attempt to use more than 10 watts in excess of the contracted load, the pull on the core 4 due to the increased flux will be sufficient to lift the core and close the magnetic circuit, thus automatically introducing into the circuit, a high impedance. This impedance is of sufficient value to reduce the voltage of the customer's load to a point where the total power taken from the supply circuit is considerably less than the contracted amount. The voltage of the load under these conditions is so low that satisfactory lighting or heating cannot be obtained.

In case of a short circuit in the customer's installation the armature immediately closes and limits the current flow to even less than that under normal conditions. The time interval being as short in this case that the smallest fuses in the circuit are left unimpaired. The power absorbed in the limiter under sustained short circuit conditions is so low that the hot spot temperature of the winding will be far below A. I. E. E. specifications.

As stated at the beginning, at the moment the incandescent lamps of the consumer are lighted, the high inrush of current during the first few hundredths of a second, due to the low resistance of the cold filaments of the lamps would raise the armature and thus close the magnetic circuit except for the insulating liquid that fills the cavities 9 between the pole faces of the core 1 and the armature core 4 and the interior sides of rectangular Bakelite tubes 3 which cannot be forced out instantaneously. However, in case of a sustained overload, this insulating liquid will have time to escape through the interstices 21 and the armature core 4 will slowly approach the core 1 until the magnetic circuit has been closed. When the consumer tries to take a greater quantity of energy than contracted by inverting the polarity of the incoming concentric cable and closing the circuit with a fraudulent ground on his premises, then as all the current will still pass through the fuse 14 which is adjusted to carry the contracted load plus a reasonable tolerance, it will melt, thus interrupting the circuit.

What we claim is:

In a current and power limiter device of multiple lighting systems, the combination of an electro-magnet having a fixed core and a movable core, the ends of the respective cores normally having an air gap spacing them apart, a casing of insulation material, coils of wire wound over said casing and connected in series, a metal case in which the aforesaid electro-magnet is mounted, insulating liquid extending substantially to the top of the fixed core of said magnet to function as a shock absorber to prevent too rapid closing of the magnetic circuit, and a stirrup seated in the limiter case, a connection plate mounted above the stirrup, adjusting screws mounted in the connection plate and bearing against the stirrup to permit of adjustment of the connection plate, and means for rigidly securing the fixed core of the electro-magnet to the connection plate, whereby the normal distance of the said fixed core relative to the movable core may be adjusted for the purpose of calibrating the device.

JOHN WEST THOMPSON.
VIRGIL ELLSWORTH METCALFE.